July 12, 1955 W. V. KING 2,712,887
BEVERAGE DISPENSING MECHANISM
Filed Aug. 1, 1949 3 Sheets-Sheet 1

INVENTOR.
WILLIAM V. KING
BY
Morgan, Finnegan & Durham
ATTORNEYS.

United States Patent Office 2,712,887
Patented July 12, 1955

2,712,887

BEVERAGE DISPENSING MECHANISM

William V. King, Brooklyn, N. Y., assignor, by mesne assignments, to Rowe Spacarb, Inc., New York, N. Y., a corporation of New York Application August 1, 1949, Serial No. 108,005

6 Claims. (Cl. 222—132)

The present invention relates to a beverage dispensing machine and more particularly to a machine wherein mixed drinks of varying temperatures may be selectively dispensed at a single drink dispensing station. The invention is herein shown as applied to a coin actuated, automatic beverage dispensing machine wherein mixed drinks are prepared from a drink concentrate and either a hot or cold drink component added to said concentrate to prepare a hot or cold drink as desired dispensed at a common dispensing station, and selectively operable control is included for allowing the customer to choose the temperature drink he desires.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
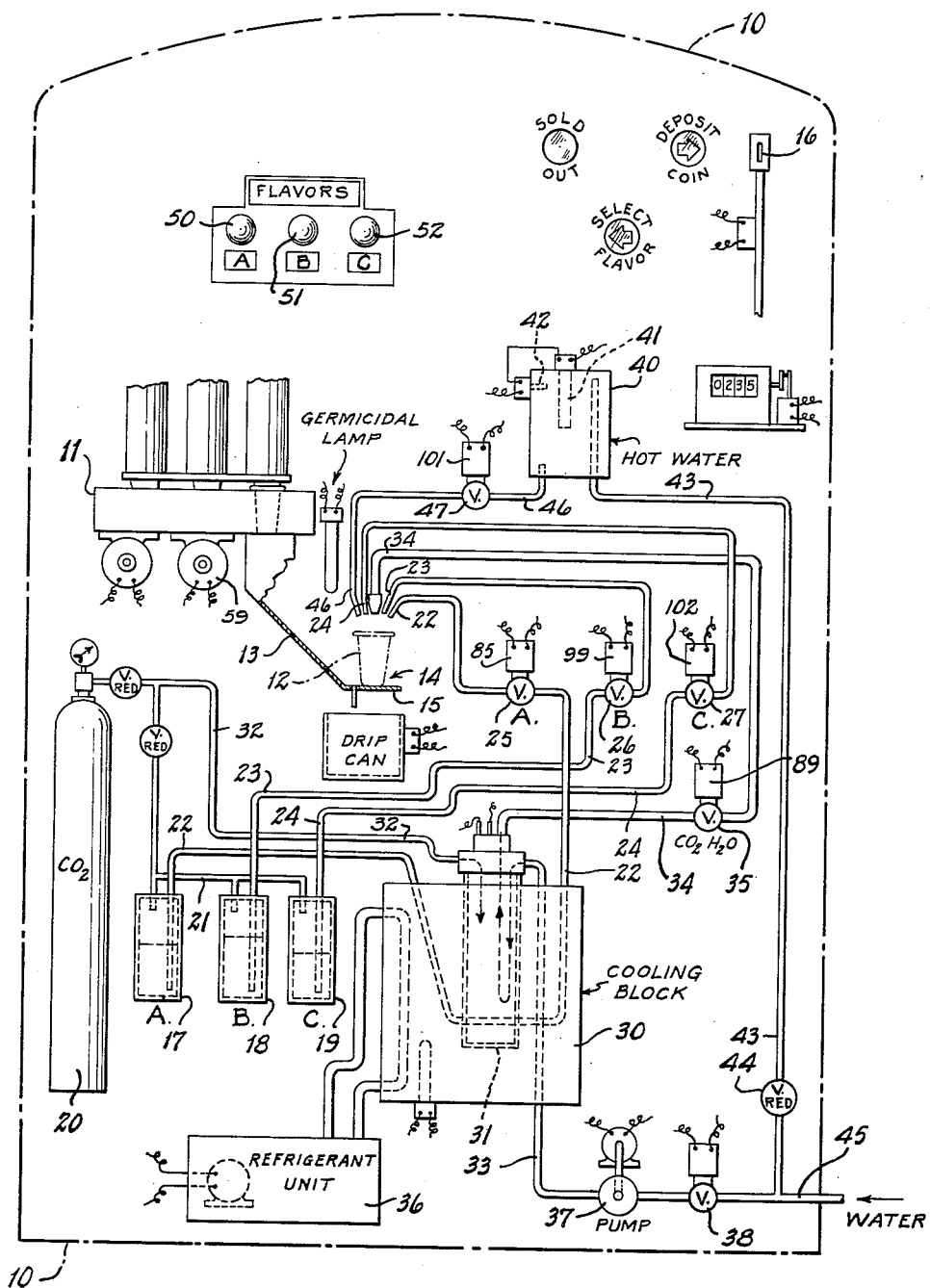
Fig. 1 is a schematic diagrammatic showing of a coin operated automatic beverage vending machine designed to dispense at a single cup station either one of two different flavors of hot drink or a cold carbonated drink, as desired and selected by the customer.

The invention has for its purpose the provision of an improved beverage dispensing machine wherein a plurality of different drinks may be selectively dispensed or vended at a single dispensing station as, for instance, into cups automatically deposited at said station, the said drinks being mixtures of a drink flavor or concentrate and another beverage component such as hot water, carbonated water or the like, the machine providing for the selective mixing of a plurality of said flavors or concentrates with a plurality of said beverage components. Another object of the invention is the provision of a machine for dispensing a plurality of different beverages to a common dispensing station, some of which beverages are hot and some of which are cold. The invention further provides a beverage dispensing machine for dispensing a plurality of different beverages to a common dispensing station each of which may be a mixture of a flavor or concentrate and another drink component, a plurality of said flavors or concentrates and said other components being provided for selective mixing. Still another object is the provision of such a beverage dispensing machine wherein a drink of total fluid quantity is dispensed, and a plurality of said flavors or concentrates may be mixed with a plurality of said other components in desired proportions in the final drink.

With the above and other objects in view, the invention is herein illustratively shown and described as embodied in an automatic beverage dispensing machine wherein a coin is deposited to automatically actuate a cup dispenser to position a cup at a beverage dispensing station and to condition the machine for further manual actuation to automatically deliver a mixed drink of a desired flavor and temperature. In the illustrated machine supply containers are provided for holding a plurality of drink flavors or concentrates such as variously might be desired to mix with other components to furnish a mixed drink. Means are provided for supplying a plurality of such other components of different characteristics for mixture with one or more of said flavors or concentrates, and in the embodiments herein shown such other components are carbonated water and plain water. Means are further provided for a variation in the heat characteristics of the said drink components, and as herein embodied, these means comprise refrigerating mechanism for the carbonated water and an immersion heater for the plain or tap water. Suitable conduit means are provided for individually conducting each of said flavors or concentrates from their containers to the dispensing station where they may be discharged into the cup, and conduit means are likewise provided for individually conducting each of said drink components to said dispensing station, said means, in the machine illustrated, being a conduit from said immersion heater for heated plain water and another conduit from said carbonator for refrigerated carbonated water.

Control and dispensing means are provided wherein the customer, after deposit of the coin as mentioned, may then press one of a plurality of buttons and there is automatically dispensed in accordance with his selection either a mixture of one of said flavors or concentrates and refrigerated carbonated water or another of said flavors or concentrates and heated plain water. The machine herein illustrated is adapted to dispense drinks with three different flavors or concentrates mixed therein, and one embodiment is shown wherein two of these fluids are individually dispensed with hot water upon the customer's pressing of one or another of two buttons provided for selection, while the third fluid is dispensed with carbonated water upon the customer's pressing of a third button. In another embodiment two of said fluids are adapted to be mixed individually with carbonated water upon pressing one or the other of two buttons, and the third button dispenses the third fluid and hot water.

The pressing of any one of said buttons by the customer initiates a cycle of operation which automatically dispenses a mixed beverage of predetermined total fluid quantity, and the ingredients of the drink may be varied by the pressing of another, or two others in spaced sequence of time, during said cycle. The pressing of an additional button during said cycle terminates the dispensing of one mixed beverage and immediately substitutes dispensing of another, so that the final ingredients in the mixed drink are proportionate to the portion of the cycle during which the mixture of each button has dispensed. It will be seen that such selective operation under manual control of the customer provides not only for intermixture of the several flavors or concentrates in a single final drink, but also for intermixture of the drink components of varying characteristics in such drink.

It will be understood that the foregoing general description and the following detailed description as well are examplary and explanatory but are not restrictive of the invention.

Figure 2:
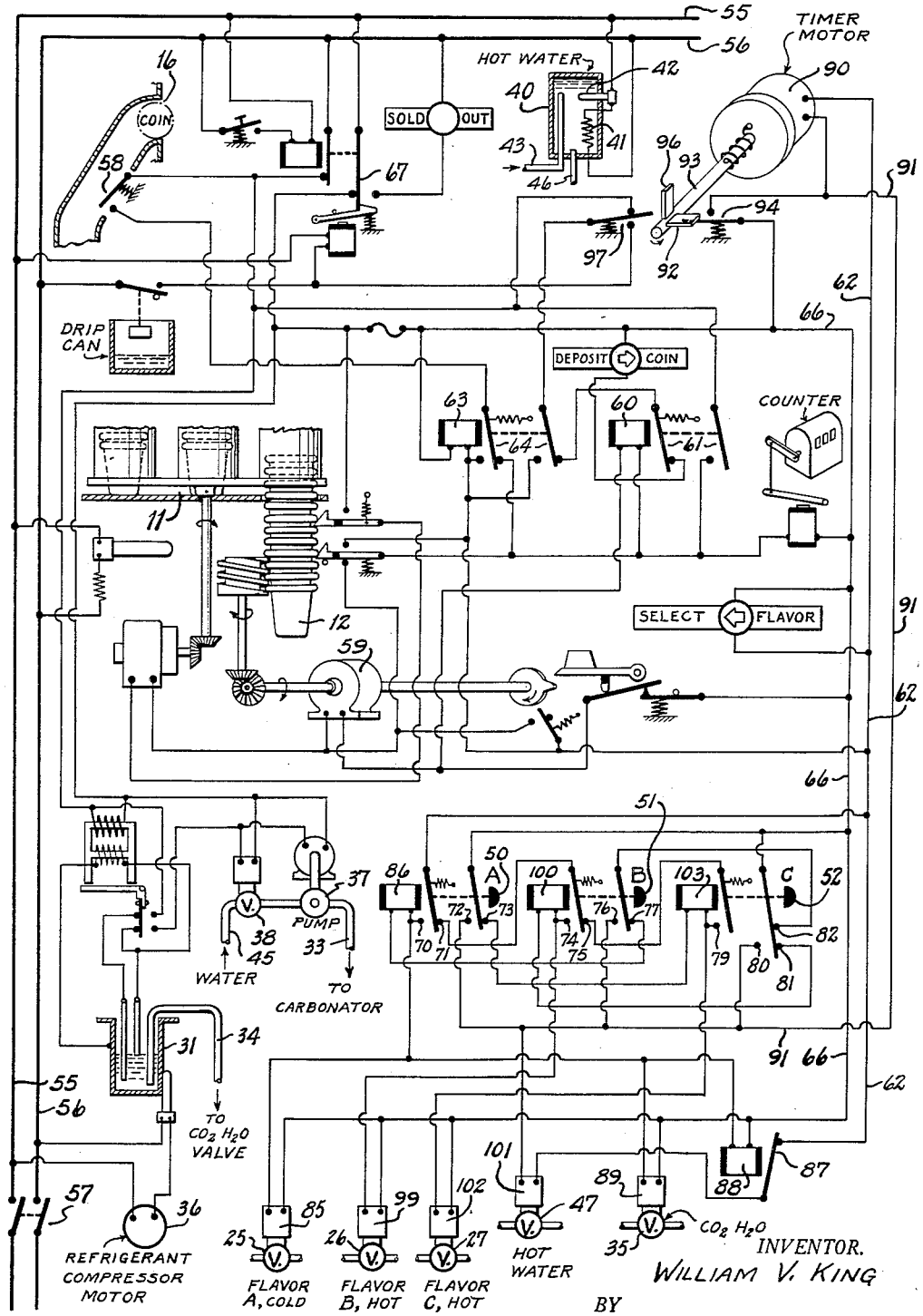
Fig. 2 is a wiring diagram showing the electrical control and operation of the machine as shown in Fig. 1; and, Fig. 3 is a wiring diagram showing a modification of part of the diagram shown in Fig. 2 necessary to provide a machine adapted to dispense one hot drink and two cold, carbonated drinks.

Referring now in detail to the illustrative embodiments of the invention as herein shown, and referring first to the embodiments of Figs. 1 and 2, the beverage vending machine of the invention represents an improvement over the device shown and described in detail in the copending application, Serial No. 32,878, filed June 14, 1948, now Patent No. 2,565,084, Aug. 21, 1951, which is assigned to the assignee of the present invention. As schematically and diagrammatically shown in Fig. 1, the machine may comprise a cabinet, the outlines of which are indicated by the broken line 10, wherein is mounted the cup dispenser 11 for the automatic release of a cup 12 to travel down the inclined path 13 and come to rest at a drink dispensing station 14 on support 15, said release taking place upon deposit of a coin in slot 16 in the front of the cabinet. The fluids serving as flavors or concentrates of mixed drinks to be dispensed are held in supply containers 17, 18 and 19 which are labeled for fluids A, B and C, respectively, in the drawings. The fluids A, B and C in containers 17, 18 and 19 are under pressure of $CO_2$ gas from the supply cylinder 20 through suitable pressure reducing valves and branched line 21, and fluids therefrom are conducted through conduits 22, 23 and 24 to the common dispensing station 14 when valves 25, 26 and 27 in said conduits are open.

The vending machine, as illustrated in Fig. 1, is adapted to dispense a drink fluid A from container 17 for mixture with refrigerated carbonated water as a component in the preparation of a cold drink, and conduit 22 is therefore preferably directed through the metallic cooling block 30, while the fluids B and C are to be mixed with a hot water component in the preparation of a hot drink, and are therefore passed through conduits 23 and 24 directly to the dispensing station 14.

A carbonator 31 is positioned within cooling block 30, receiving $CO_2$ gas and plain or tap water through lines 32 and 33 respectively, and refrigerated carbonated water is conducted through conduit 34 to dispensing station 14 when valve 35 is open. A suitable refrigerating unit 36 is provided for the cooling block 30, a pump 37 is provided to supply water to the carbonator, and an automatically operated valve 38 provided in the water line to the carbonator. Means for providing a hot drink component for mixture with certain of the flavoring or concentrate fluids in containers 17, 18 and 19 comprise the container or vessel 40 having an immersion heater 41 therein under the automatic control of thermostat 42 (Fig. 2) for heating water which is conducted to the vessel by line 43 having a suitable pressure reducing valve 44 therein, from the plain or tap water supply line 45. Hot water is conducted from vessel 40 by conduit 46 to the beverage dispensing station 14 when valve 47 is open. The buttons 50, 51 and 52 are positioned on the front of the cabinet 10 and, as indicated, are adapted to dispense flavors A, B and C, respectively, when pushed by the customer which, in the illustrative device shown in Figs. 1 and 2, will be a mixture of flavor A and refrigerated carbonated water, a mixture of flavor B and hot water, and a mixture of flavor C and hot water.

The electric circuit means for control of the embodiment of the invention shown in Fig. 1 is set forth in detail in Fig. 2. The control circuit of the machine is in general similar to that shown in copending application Serial No. 32,878 to which reference has been made above and for that reason no detailed description of identical circuits will be made herein, a full disclosure being made herein and a detailed description being available in said copending application. The circuit shown in Fig. 2 is identical to that shown in said application, with the exception of: (1) the addition in Fig. 2 hereof of the immersion heater 41 which is connected across main leads 55 and 56 for the machine, being under control only of the main switch 57, so that hot water of predetermined temperature is always available when the main switch 57 is closed; and (2) the circuit for push buttons 50, 51 and 52 shown at the lower right hand corner of Fig. 2, a detailed description of which will be made.

In general, the essential operation of the machine herein shown and as described in said application, Serial No. 32,878, consists in the closing of switch 58 by the coin inserted in slot 16, to automatically dispense a cup from dispenser 11 by the cycle of operation of cup dispenser motor 59 under control of a holding solenoid 60 and single throw gang switch 61. The momentary closing of switch 58 likewise serves to energize line 62 from main line 56 for the auxiliary circuit including the switches controlled by push buttons 50, 51 and 52, and said line remains energized after completion of the cycle of operation of the cup dispenser by action of holding solenoid 63 and double throw gang switch 64. The operation of the machine is therefore to automatically dispense a cup 12 and position it at dispensing station 14 upon deposit of a coin, and to energize line 62 for the auxiliary circuit including the push buttons 50, 51 and 52, so that the customer may thereafter make his selection by pushing one of the buttons (or more in spaced time sequence) to open the necessary valves to dispense the desired drink. The other line 66 for the auxiliary circuit is meanwhile connected to main line 55 through the normally closed switch 67.

The push buttons 50, 51 and 52 are each connected to actuate a double throw gang switch the contacts therefore being numbered as follows: 70, 71, 72, 73 for button 50; 74, 75, 76 and 77 for button 51; and 79, 80, 81 and 82 for button 52. Assuming now that the customer, after coin deposit and cup dispensing, presses button 50, a circuit is established from line 62, through contact 70 to solenoid 85 and thence to line 66, the solenoid serving to open valve 25 for dispensing of flavor A at the dispensing station 14. The solenoid 86 is likewise energized to hold the switch for button 50 in actuated position, through a circuit including contacts 77 and 82 of the switches for selective buttons 51 and 52. A breaking switch 87 in the circuit of the hot water valve 47 is opened by action of solenoid 88 which is energized through circuit 62, 70, 88 and 66 preventing operation of the hot water valve, and carbonated water valve 35 is opened by its solenoid 89 energized through circuit 62, 70, 89, 66, to provide refrigerated carbonated water for mixing with flavor A at the dispensing station.

At the same time, a circuit for operation of timer motor 90 is established from line 62 through the winding of the motor, line 91, contact 72 and to line 66, starting operation of the motor for the timing of the dispensing of a drink of predetermined total fluid quantity. The cam 92 on shaft 93 of motor 90 is rotated as indicated by the arrow in Fig. 2 associated with the shaft to immediately allow closing of switch 94 to establish a circuit between lines 62 and 66 including the motor 90 for operation of the motor through a complete cycle independently of the circuit including the switches of the push buttons 50, 51 and 52. Continued rotation of motor 90 engages cam finger 96 with switch 97 to depress the arm thereof to its lower position, and this serves to deenergize solenoid 63, reverse the position of switch 64 (allowing return to the position as shown in Fig. 2) and opens the circuit to lead 62 from main line 56. The cold carbonated drink of flavor A has thus been dispensed, and the auxiliary circuit to the push button switches and timer motor 90 is deenergized until such time as another coin is deposited and the cycle of operation described is repeated.

In the event that a hot drink of flavor B is desired, the customer will push button 51 to engage switch contacts 74 and 76. In this case the circuit to solenoid 99 is completed from line 62, contact 71, contact 74, solenoid 99 and line 66 to open valve 26; the solenoid 100 is energized from line 62, through contacts 71, 74, 81 to line 66 to hold the switch for button 51 in actuated position; the hot water valve 47 is opened by actuation of its solenoid 101 which is energized from line 62 through switch 87 (which in this case is not opened), contact 76, contact 82, to line 62; and the timer motor circuit is again closed through circuit 62, motors 90, 91, contact 76, contact 82, and line 66. In this case the operation of motor 90 opening switch 97 again deenergizes the entire selector button switch and timing motor auxiliary circuit.

When the selector button 52 is pushed, a hot drink of flavor C is dispensed, the operation being similar to that described for button 51. The contacts 79 and 80 are engaged, and solenoid 102 is energized to open valve 27 through circuit 62, 71, 75, 79, 102 and 66; solenoid 103 is actuated to hold the switch in its operated position through circuits 62, 71, 75, 79, 103, 73 and 66; hot water valve 47 is opened through circuit 62, switch 87, solenoid 101, contact 80, to line 66; and the motor 90 is energized through circuit 62, 90, 91, contact 80 and line 66.

In the event that the customer should wish to mix a drink of flavors B and C, he would have merely to push one of the buttons 51 or 52 to actuate the double throw gang switch associated therewith and, at any time before the timer motor 90 had completed its operation to complete the timing of dispensing of the drink, press the other of the two buttons. Such action serves to terminate immediately the flow through valve 26 or 27 and begin flow through the other, since each of the switch holding solenoids 100 and 103 are dependent for their continued energization upon the position of the other gang switch is unactuated or unpushed condition. In the instance mentioned, flavors B and C could be mixed with a single component such as hot water, and likewise, since the circuit to solenoid 86 is also dependent upon circuits through the unactuated gang switches for the other two buttons 50 and 51, a flavor B or C or both and hot water could be mixed with flavor A and refrigerated carbonated water in desired proportions in the final drink of predetermined total fluid quantity. While this latter possibility would not be particularly desirable with the drink components set forth in the illustrative embodiment of the invention as herein described, such capability is of considerable importance where other drink components are concerned.

Figure 3:
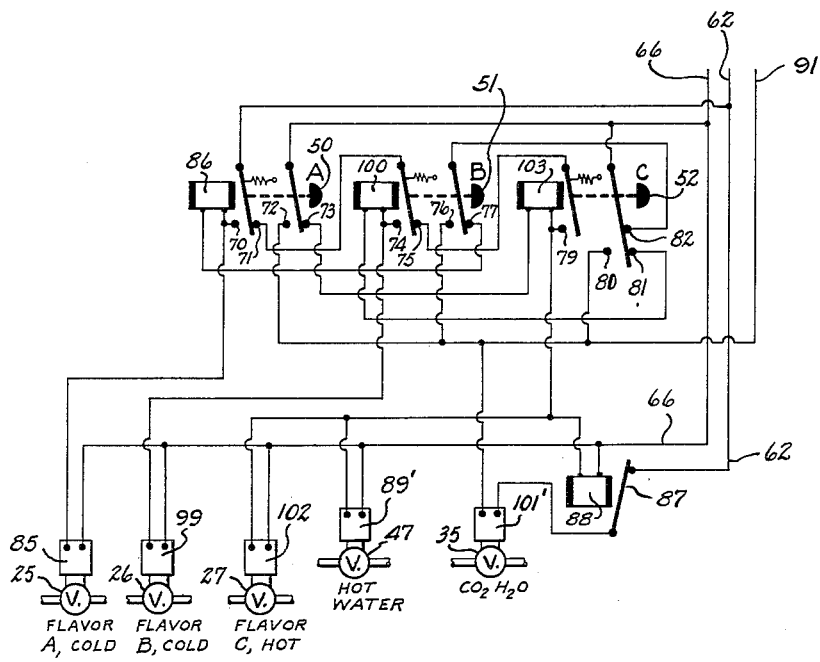

In Fig. 3 there is illustrated a modified wiring circuit for the buttons 50, 51 and 52 and their related switches and valves, wherein the machine of the invention is adapted to dispense cold carbonated drinks of flavor A or B, or a hot drink of flavor C, or mixtures thereof as already discussed in connection with the foregoing embodiment. This embodiment involves, in effect, reversing the positions of solenoids 101 and 89 as shown in Fig. 2, so that the solenoid 89′ of Fig. 3 now controls the hot water outlet valve 47 and the solenoid 101′ in Fig. 3 controls the carbonated water valve 35. The circuits to said solenoids 89′ and 101′ remain the same as that to solenoids 89 and 101, and the functional effect is to place the solenoid 88 of switch 87 in the circuit of the hot water valve 47, so that when buttons 50 or 51 are pressed, carbonated water valve 35 is opened and hot water valve 47 remains unactuated, while, if button 52 is pressed, hot water valve 47 is opened and switch 87 is opened to prevent operation of carbonated water valve 35. In other respects, operation of the embodiment of Fig. 3 is entirely similar to that of Figs. 1 and 2 already discussed.

The invention in its broader aspects is not limited to the specific mechanisms shown and described but departures may be made therefrom within the scope of the accompanying claims without departing from the principles of the invention and without sacrificing its chief advantages.

What is claimed is:

1. In a beverage dispensing machine, a plurality of flavor containers, a first beverage component supply, a second beverage component supply, a beverage dispensing mechanism, a first selecting means, a second selecting means, means responsive to the actuation of the first selecting means for controlling the flow of one of said flavors and one of said components to said dispensing mechanism, means responsive to the actuation of the other of said selecting means for controlling the flow of one of said flavors and the other of said components to said dispensing mechanism and means responsive to the actuation of one of said selecting means for preventing the operation of the other of said selecting means.

2. In a beverage dispensing machine as in claim 1 in which each of said beverage component flow control means includes a valve and a valve operating solenoid, each of said selecting means including means for energizing the valve operating solenoid corresponding to one of said components, said means responsive to the actuation of one of said selecting means for preventing the operation of the other of said selecting means including a normally closed switch connected in series with the valve operating solenoid of the flow control means associated with said other of the selecting means and means for opening said switch when said one of the selecting means is actuated.

3. In a beverage dispensing machine as in claim 1 in which each of said beverage component flow control means includes a valve and a valve operating solenoid, each of said selecting means including a switch operable to complete the circuit of one of said valve operating solenoids and a holding means for said switch, the arrangement being such that the holding means for one of said switches is rendered inoperative by actuation of the other of said switches.

4. In a beverage dispensing machine as in claim 1 in which each of said beverage component flow control means includes a valve and a valve operating solenoid, each of said selecting means including a switch having a pair of sets of contacts and a pair of contact arms normally in engagement with one set of contacts and a holding circuit for said switch, the contact arms of a first one of said switches being operable to engage the associated set of contacts other than said normally engaged set of contacts to energize the corresponding holding circuit and one of the valve operating solenoids, the holding circuit associated with the operated switch including the normally engaged set of contacts of the other of said switches.

5. In a beverage dispensing machine, a plurality of flavor containers, a first beverage component supply, a second beverage component supply, a beverage dispensing mechanism, a plurality of selecting means, a plurality of means responsive to the operation of the respective selecting means for controlling the flow of one of said flavors and one of said components to said dispensing mechanism, and means responsive to the actuation of one of said selecting means for preventing the operation of the remainder of said selecting means.

6. In a beverage dispensing machine as in claim 5 including means for selectively varying the proportions of the total amount of said flavors.

References Cited in the file of this patent

UNITED STATES PATENTS

| | | |
|---|---|---|
| 2,462,019 | Bowman | Feb. 15, 1949 |
| 2,565,084 | Parks | Aug. 1, 1951 |
| 2,569,486 | Mills | Oct. 2, 1951 |
| 2,658,645 | Harris, Jr. | Nov. 10, 1953 |